Patented May 23, 1939

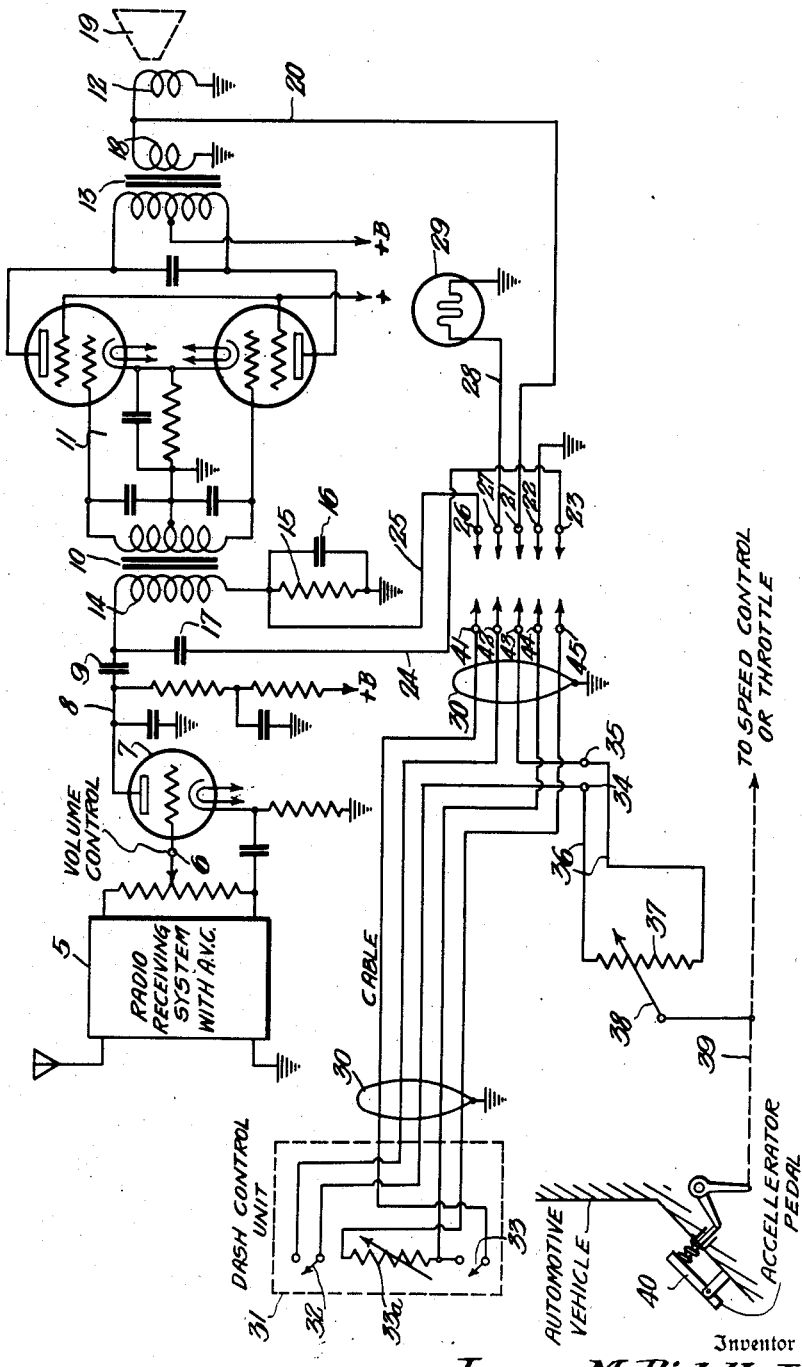

2,159,052

UNITED STATES PATENT OFFICE 2,159,052

VOLUME CONTROL SYSTEM

James M. Riddle, Jr., West Collingswood, N. J., assignor to Radio Corporation of America, a corporation of Delaware Application June 30, 1937, Serial No. 151,216

5 Claims. (Cl. 250—20)

The present invention relates to radio receivers and similar sound producing apparatus adapted for use in automobiles and the like, and more particularly it relates to a volume control system for apparatus of the character above referred to.

It is an object of the present invention to provide an improved volume control system for automobile radio receiving apparatus and the like which is conjointly responsive to variations in the volume level of the signal output to the sound producing device and to variations in speed of the vehicle, thereby to improve the reception of broadcasting stage programs at varying speeds of travel without requiring manual adjustment of the apparatus.

It has been found that in the reception of radio broadcast programs and the like in a moving vehicle that the windage and motor noises which increase with speed of travel, may interfere with the normal sound production from the loudspeaker or other sound output means in connection with the apparatus and that both volume level control and expansion of the sound output is desirable in order to reproduce the program to best advantage.

It is desirable that the speed and signal level responsive means for an automobile radio receiver may be arranged to be attached to the receiver installation in order that it may be added after the installation is made and when desired. Accordingly, it is a further object of the present invention to provide a volume control system for mobile sound producing apparatus such as an automobile radio receiver, which may be attached thereto or detached therefrom without affecting the normal operation of the apparatus when not attached, and which is readily installed in connection with a vehicle and a radio receiving or sound producing apparatus.

It is also a further object of the present invention to provide a volume control system of the character above referred to as a unitary wired assembly for attachment to a mobile radio receiving or sound producing apparatus and speed control element of an automotive vehicle.

As is well understood, volume range expansion of the sound output of a radio receiving system is provided for increasing the output of the receiving apparatus in response to an increase in the signal output of the apparatus, thereby to restore to normal the dynamic volume range of a broadcast program, which for the purpose of preventing overmodulation at the transmitting stage is monitored to a predetermined sound level adapted to prevent overmodulation.

The control of the sound output whereby the latter is increased with increased speed of the vehicle is desirable to overcome the windage and other corresponding noises of operation accompanying operation of the vehicle at increasing speeds. The latter is most readily accomplished by causing a circuit control element to respond to movement of an element connected with the vehicle, which element moves in response to changes in speed of travel of the vehicle such as the accelerator mechanism or pedal, for example.

For the control of dynamic expansion or volume, it has been found that the output circuit of a sound producing apparatus may variably be loaded by suitable means and controlled in response to variations in speed of the vehicle and of the strength of the signal output from the apparatus.

Accordingly, it is a further object of the present invention to provide an improved volume control system for radio receiving apparatus and the like for vehicles which may be attached to the output circuit of the apparatus and connected with the speed responsive element of the vehicle such as an accelerator pedal or mechanism.

It is preferable that the volume control system be provided with a plug-in connection cooperating with a similar connection on the apparatus whereby it may readily be attached thereto and that the circuits of the apparatus may be adapted for normal operation without the external volume control means when the latter is detached.

For this reason the apparatus is preferably arranged to have a normal volume control means and the like and the usual automatic volume control means incorporated therein.

The invention will be better understood, however, from the following description when considered in connection with the accompanying drawing and its scope will be pointed out in the appended claims.

In the drawing, the figure is a schematic circuit diagram of an automobile radio receiver provided with a volume control system embodying the invention.

Referring to the drawing, a radio receiving system is indicated generally at 5 and includes any suitable receiving circuits up to and including the volume control device which is indicated at 6. The system is preferably provided with automatic volume control means and the device 6 is any suitable manually operable volume control potentiometer and the like connected with the receiving circuits. In the present example it is provided as an audio frequency volume control device in connection with an audio frequency amplifier device 7, the output circuit 8 of which is coupled through a coupling capacitor 9 with an audio frequency coupling transformer 10 in connection with the output audio amplifier stage 11 which, in turn, is coupled to a loudspeaker voice coil 12 through a suitable audio frequency output coupling transformer 13.

The interstage transformer 10 comprises a primary winding 14 having in series therewith a resistor 15 and a shunt capacitor 16 for the resistor. The primary is also provided with a shunt capacitor 17 the connections for which will hereinafter be described together with the connections for the resistor 15 and capacitor 16. The output stage 11 may be of any suitable type and as shown is of the push-pull type adapted to provide a relatively high power output for the apparatus. The secondary of the output transformer 13 for the output stage is indicated at 18 and is connected in shunt with the loudspeaker voice coil 12, the loudspeaker diaphragm being indicated at 19.

It will be noted that the loudspeaker circuit is grounded through the voice coil and the secondary 18. The ungrounded connections for the voice coil and the secondary 18 are provided with a common lead 20 which is connected to one terminal 21 of a suitable plug connection in the receiving apparatus. Other plug connections associated therewith include a grounded terminal 22, and a terminal 23 connected through a lead 24 with the shunt capacitor 17 for the primary 14. The resistor 15 and capacitor 16 are connected to ground as indicated and are also connected at the junction of the primary winding through a lead 25 with a plug terminal 26.

The remaining plug terminal 27 is connected through a lead 28 to ground through a current responsive variable resistance device 29 which may be provided by a battery lamp. This may be of the commercially available type used for automobile lighting such as 6-8 volt, 15 candle power lamp.

The operation of the receiving system is such that the signals transmitted therethrough are applied to the loudspeaker device under control of the volume control means 6. For additional volume and tone control, a cable connection is provided by a shielded and grounded cable 30—30 which has a suitable length to extend from the receiver to a dash control unit indicated at 31 containing suitable circuit control devices comprising in the present example two switches 32 and 33 and a variable resistance element 33a. Two terminals 34 and 35 are also provided on the cable for an extensible control circuit 36 connected with a variable resistor or impedance device 37 which is arranged to be variably controlled in response to variations in speed of the vehicle in which the receiver or sound producing apparatus is located. In the present example, the variable control element indicated at 38 for the variable control element 37 is connected as indicated by the dotted connection 39 with an accelerator pedal 40 through the usual mechanical elements constituting the accelerator mechanism between the accelerator pedal and the speed control or throttle as indicated. The cable 30—30 is adapted at the receiver end to be connected with the plug or other terminals provided and, in the present example, is provided with plug-in terminals indicated 41–45 inclusive.

The circuit lead 20 connected with the high potential side of the receiver output circuit may be traced through the terminals 21 and 43 to a terminal 35 through the leads through the circuit leads 36 and the variable resistor 37 to the terminal 34, and thence through a cable lead to the switch 32. When the switch is closed the circuit is completed through a second terminal 10 lead in connection with the plug terminal 42 thence to the receiver terminal 27 through the lead 28 and the lamp 29 to ground and the low potential side of the receiver output circuit at the secondary 18.

The terminals 34 and 35 on the cable are provided in order that the control leads 36 may be connected therewith as desired after the receiver is installed and after the dash control unit is installed, in which case the terminals 34 and 35 are connected together.

In either case, when the plug connections are completed, the lamp 29 as a variable resistance device is connected in shunt with the secondary of the output transformer and with the loudspeaker voice coil. When the switch 32 is closed, operation of the receiver then causes the resistance element of the lamp 29 to receive a portion of the receiver output and as the latter increases increased heating of the filament causes an increase in resistance which serves to increasingly unload the loudspeaker or output circuit and thereby to affect volume range expansion of the signals applied to the output device. This may be controlled by operation of the switch 32 and when the variable speed responsive variable control element is connected in circuit at the terminals 34 and 35 as shown, the arrangement is such that the resistance of the element 37 is increased in response to an increase in the speed by operation of the accelerator pedal, which action also increases the resistance across the signal output or loudspeaker circuit and results in increased volume with increased speed.

The resistance device 29, while more readily provided by a lamp having the characteristics hereinbefore referred to, may be any suitable resistance device which responds to current variations to provide a change in resistance, the resistance increasing with current and temperature. The maximum resistance of the variable volume control resistor 37 is preferably several times the variable resistance of the temperature controlled device 29. With the series combination of the temperature responsive device or lamp 29 and the speed controlled variable resistance device 37 shunted across the receiver output circuit or sound producing device, the variable resistor is mechanically actuated by the vehicle's speed and arranged to be moved to provide approximately zero resistance when the vehicle is substantially at rest or traveling at a predetermined low speed and increases in resistance as the vehicle's speed increases.

With the variable resistance 37 at zero, the temperature responsive device or lamp 29 acts as a dynamic volume range expander across the receiver output circuit or sound producing device. As the vehicle's speed increases, the variable resistor operates to insert an increasing resistance in the series volume control circuit and removes the loading effect on the output of the receiver, thus increasing the volume and keeping it above the increasing windage and operating noises of the vehicle independently of the volume control adjustment provided by the device 6 in the receiver. However, this may be adjusted manually for any desired normal volume level. It will also be seen that the ability of the dynamic expander device 29 to provide volume range expansion gradually decreases with increased speed. The manual control alone may be used by opening the switch 32 thereby rendering the speed responsive means and the volume expander means ineffective to control the volume.

In a preferred embodiment of the invention, a voice coil resistance of substantially three ohms was provided in connection with a variable resistance device at 37 having a variable resistance range of from zero to 15 ohms and in connection with a variable resistance element at 29 provided by a 15 C. P., 6-8 volt tungsten lamp. The power output was handled through a power output stage 11 having two RCA 6V6G tubes. The dash control unit is arranged to provide bass and treble tone control through suitable connections provided for the variable control element 33 and 33a. For the treble tone control, the circuit may be traced from the shunt capacitor 17 through the lead 24 and plug terminal 23 to the corresponding cable terminal 45, thence through the cable to the variable resistor device 33a and returning through the cable to a terminal 44 and the grounded terminal 22. Operation of the variable resistor 33 serves to vary the resistance in circuit with the shunt capacitor 17 for the primary circuit of the coupling transformer 10, thereby controlling the high frequency end of the audio frequency range, the high frequency tone being reduced as the value of the resistor 33a is reduced.

The bass tone control is provided in connection with the resistor 15 and shunt capacitor 16 traced in series with the primary 14, the two devices being rendered ineffective in the circuit by short-circuiting the switch 33. This connection is traced through the lead 25 to the plug terminal 26 on the receiver, thence to the corresponding plug terminal 41 for the cable, thence from the cable to the switch 33 and returning through a circuit common to the resistor 33a to the cable terminal 44 and the grounded receiver terminal 22. This provides a return connection to the grounded end of the resistor and capacitor elements. The operation is such that when the switch is closed the bass response is increased since the series impedance effect of the capacitor and reistor in shunt is removed from the circuit.

From the foregoing description it will be seen that volume expansion and speed responsive volume control may effectively be provided in connection with a mobile sound producing apparatus through a simple series circuit connection with the output circuit, adapted for plug-in extensible connection with a dash control unit and that this circuit may include only two series variable elements, one of which is placed under control of a speed responsive element of the automotive vehicle and the other of which is responsive to the signal level of the output to the sound producing device to variably decrease the load effect with increased signal strength. It will further be seen that this effect is reduced as the speed control device becomes increasingly effective in the series circuit to provide a predominating control and for this effect it is preferable that the speed responsive circuit controlling element be provided with a maximum impedance or resistance substantially greater than the normal resistance or impedance of the temperature or signal responsive variable resistance device.

The temperature and resistance of the device 29 is dependent upon the signal amplitude applied to the output circuit and forms a variable load device across that circuit. Any suitable device having a resistance element, the resistance of which varies with temperature variation in response to the flow of a controlling current therethrough may be utilized and the effectiveness of such element when the device 37 is actuated is dependent upon the resistance provided by the latter device under control of the speed responsive element of the vehicle, and, in a preferred arrangement, the latter gradually assumes full control of the loading effect whereby, at relatively high speeds, the volume range expansion is rendered ineffective.

The dash or remote control unit may include any suitable auxiliary control device such as those illustrated and the connections thereto may be included in the same cable connection as provided for the volume range expansion and speed control circuit.

The terminal connection with the cable connection between the receiver and the remote control unit is desirable in that the speed control connection may be arranged and connected at any suitable time after the receiver and cable connection installation is made in the vehicle and from the terminals 34 and 35 any suitable extensible circuit connection may be made for the speed responsive circuit control element which, likewise, may be of any suitable type although the arrangement as shown is at present preferred because of its simplicity.

I claim as my invention:

1. The combination with mobile sound producing apparatus, of volume control means therefor, speed control means for exerting a control of volume for said apparatus, and dynamic volume range expansion means for said apparatus, said second named volume control means and dynamic volume range expansion means being independent of said first-named means, and said second named volume control means providing a predominating control with increased speed with respect to the control exerted by said volume range expansion means.

2. The combination with mobile sound producing apparatus, of volume control means therefor, speed control means for exerting a control of volume for said apparatus, dynamic volume range expansion means for said apparatus, said second named volume control means and dynamic volume range expansion means being independent of said first-named means, a signal output circuit for said apparatus, and a series control circuit connected in shunt therewith and including said second named volume control and dynamic volume range expansion means, and means in circuit therewith for rendering said last-named means ineffective.

3. The combination with mobile sound producing apparatus having a sound producing output device, of means for controlling the volume of sound delivered by said device comprising a signal output circuit connected with said sound producing device, a series volume control circuit connected effectively in shunt with said output circuit, a volume expansion control device in said circuit having a resistance which varies with temperature variation in response to variations in the output signal current from said apparatus, and a variable resistor in series with said volume expansion control device having a maximum resistance substantially greater than said first-named resistance device when receiving a normal signal output current, and speed control means connected with said series variable resistor to increase the resistance thereof in response to an operation of said control means for an increase in speed.

4. The combination with a radio receiver, of a signal output circuit connection therefor, an external volume control circuit detachably connected in shunt with said output circuit and comprising in series a variable resistor and a resistance element which increases in resistance with increased temperature corresponding to an increase in current flow therethrough, and an automotive vehicle speed control element connected with said first-named resistance device to increase the resistance thereof with increased speed, whereby the volume of signal output is increased and the resistance change of said resistance element is rendered less effective to change said output.

5. In a mobile sound producing system, the combination of a radio receiver, a loudspeaker device connected therewith to receive the signal output therefrom, volume control means therefor responsive to variations in the signal ouput level for effecting dynamic volume expansion, said means including a control circuit connected in shunt with the loudspeaker device and a low power lamp in said circuit the resistance of which increases with increased signal volume applied to said speaker device, a series variable resistance device for said lamp, and control means having a movable speed control element connected with said variable resistance device to vary the resistance thereof with variations in speed.

JAMES M. RIDDLE, Jr.